C. L. SEYLER.
AUTOMOBILE TRACKWAY.
APPLICATION FILED SEPT. 5, 1919.
1,326,109.
Patented Dec. 23, 1919.
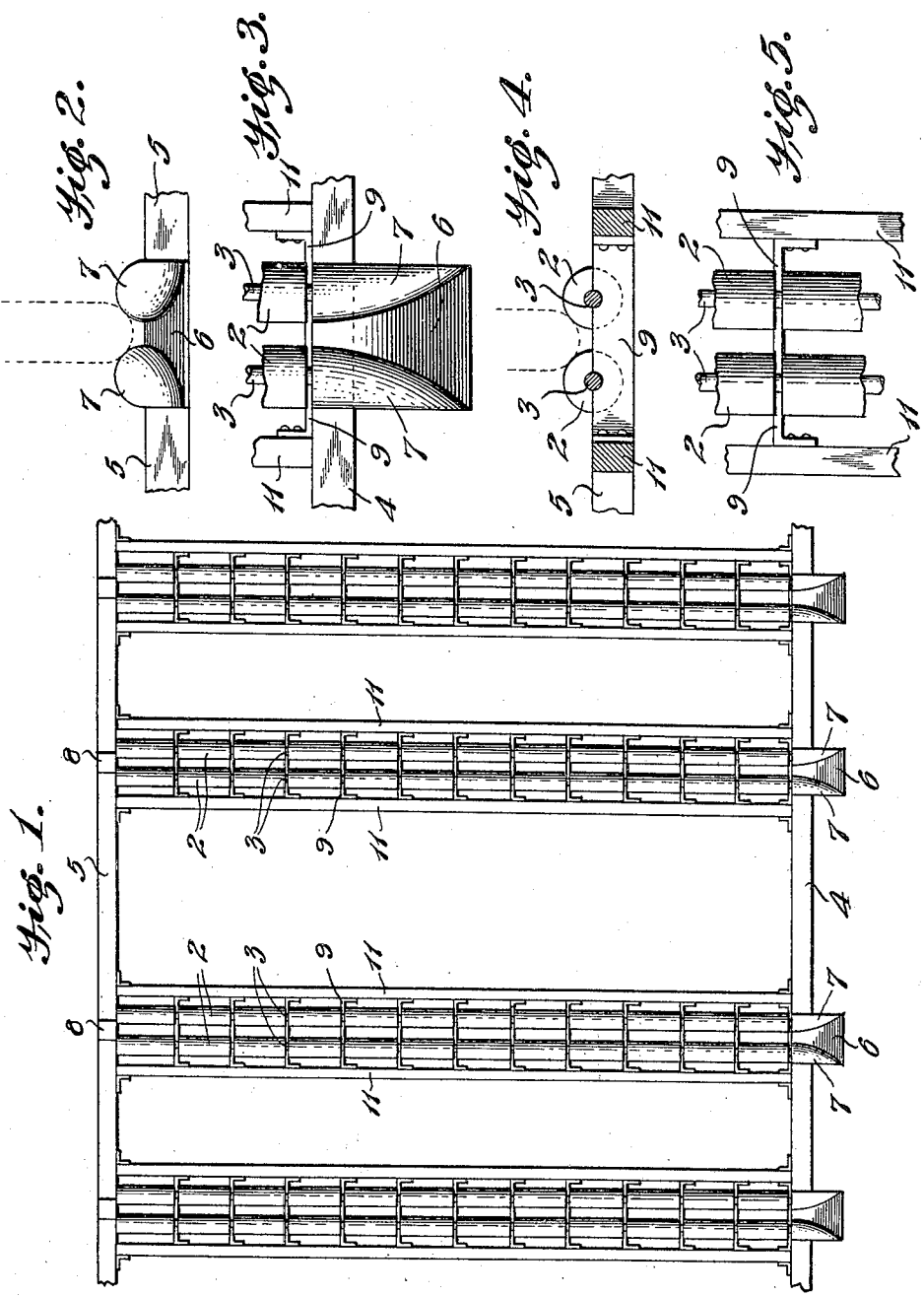
Inventor
Chas. L. Seyler,
By Mason, Fenwick & Lawrence,
Attorneys

UNITED STATES PATENT OFFICE.

CHARLES L. SEYLER, OF OAKVALE, WEST VIRGINIA.

AUTOMOBILE-TRACKWAY.

1,326,109.  Specification of Letters Patent.  Patented Dec. 23, 1919.

Application filed September 5, 1919. Serial No. 321,896.

*To all whom it may concern:*

Be it known that I, CHARLES L. SEYLER, a citizen of the United States, residing at Oakvale, in the county of Mercer and State of West Virginia, have invented certain new and useful Improvements in Automobile-Trackways; and I do hereby declare the following to be a full, clear, and exact description of the invention, such as will enable others skilled in the art to which it appertains to make and use the same.

This invention relates to automobile storage or garage equipment and pertains especially to a form of stand onto which a vehicle or automobile may be driven to a given position.

As is well known in public garages and in many private garages where more than one machine is to be housed and where space is valuable, it frequently happens that due, sometimes to indifference, sometimes to inability and frequently to haste, the several vehicles are not properly tracked or run into their given spaces with a result that the fenders of the cars will project beyond designated lines and other cars will be crowded so as to make it inconvenient to pass around or have access to the same and often the cars are damaged because of overcrowding for the lack of suitable standing space. It is therefore one of the important objects of the present invention to provide means for positively positioning a car, by such term meaning an automobile, in its given position and thus avoid overcrowding and injury to the cars being run in, and again it is the object of the invention to provide a means for facilitating the running in of a car when the car space is for obvious reasons limited, as when the car stand or garage is of relatively small dimensions and in which case the garage may be large enough only for a single car and leave, barely, space to get around. Another object of the invention is to provide therefore a vehicle stand including a trackway that will automatically center the wheels of the vehicle in a given position in the event that it should be run in off the given lines.

With the above and other objects in view, the invention consists of the construction, the combination and in details and arrangements of the parts as more particularly described hereinafter relative to the embodiment of the invention, illustrated in the accompanying drawings.

Wherein Figure 1 is a view of a portion of the floor of a garage showing a plurality of the improved stands in position.

Fig. 2 is an enlarged plan view of a single garage vehicle stand.

Fig. 3 is an end view of Fig. 2 looking into the end or entrance of the stand.

Fig. 4 is a plan view in detail of a portion of the stand to illustrate a saddle for supporting the journal rod of a set of rollers.

Fig. 5 is a fragmentary enlarged portion of Fig. 1, showing the roller mounts.

The present invention comprises generally sets of roller means here shown as including a series of cylindrical rollers, which are arranged substantially from end to end, the rollers being of suitable diameter and length according to the requirements in a given case, a series of rollers 2 being mounted on a suitable journal shaft or rod 3, the ends of which are shown as passed through front and rear sill members 4 and 5, which may be made of wood or other suitable material laid upon or countersunk in the floor of the garage or other storage place. A pair of rods 3 with respective rollers 2 forms one trackway for the wheels of one side of a vehicle when the rollers are laid in parallelism at a suitable space so that the upper and adjacent portions of the surfaces of the rollers form a support along which the wheels can travel. Therefore one set or pair of rods 3 with their rollers 2 forms the tracks for the left hand wheels of the car while another pair of rods with their rollers form the track for the right hand pair of wheels of the car, the pairs being spaced, obviously according to the gage of the car. The front end of the trackway formed by the pairs of sets of rollers 2—2 is provided with ingress or guide devices of any suitable construction or material and indicated at 6 as comprising guideways having upwardly and outwardly diverging side or guide walls 7—7 to facilitate the entry of the front wheels onto the trackway formed by the pairs of sets of rollers, and at the rear end of the trackway any suitable stop device may be utilized, such, for instance, as block 8, secured to the rear sill 5.

In order to support the rods 3—3 against bending under the weight of the car, suitable bearing plates or braces 9 illustrated in Fig. 4 are placed beneath the respective pairs of rods, and in this case the ends of the braces 9 are fastened by bolts or other suitable devices to longitudinally extended stringers 11 along each side of the trackways these stringers being suitably connected to the front and rear sills by mortising and tenoning. It is obvious of course that I am not limited to any particular means for mounting the pairs of trackways or rollers as this may be accomplished according to the exigencies in the installation of the apparatus.

Upon the foregoing it will be seen that by my present invention when the trackways are laid either in a garage, where there may be a number of machines, or in the case where there may be a single garage of a width just sufficient to receive a single car and allow passageway around the same, the operator has to run the car onto the trackways and if the wheels are off center with respect to a given pair of sets of rollers, the rollers will automatically turn over under the weight of the car and throw the wheels inwardly to a position centrally between the pairs of rotary track members. It is preferable that the rotative track members be made up in sections rather than a continuous piece the length of the trackway this to avoid undue friction that would occur by the tendency of the continuous trackway to roll under the pressure of the front wheels, for instance, if they were off center while the rear wheels would be running true.

When I utilize sills upon which to support the rotary tracks, the car is then lifted somewhat and facilitates underneath repairing as may be necessary, and again, when this trackway is utilized in public garages, the cars are automatically positioned in their given spaces and the annoyance of having overcrowding is eliminated. Furthermore, a great saving of time is secured because of the readiness with which a car may be run directly into its given position in a single attempt so long as the wheels of the car are brought approximately within the vertical planes passing longitudinally through the axis of the rollers 3.

What I claim is:

1. A trackway comprising pairs of rotary tracks set in parallelism and in such juxtaposition as to automatically roll and move a body resting thereon to a medial plane between the parallel axes of the tracks.

2. A trackway comprising pairs of cylindrical rotary tracks in parallelism and in such juxtaposition as to automatically roll and move a body resting thereon to a medial plane between the parallel axes of the tracks.

3. A trackway comprising pairs of rotary tracks set in parallelism and in such juxtaposition as to automatically roll and move a body resting thereon to a medial plane between the parallel axes of the tracks, and means for guiding the wheels of a vehicle onto the trackway.

4. A storage stand for vehicles comprising pairs of parallel rotary members, said pairs spaced approximately from each other a distance equal to the gage of a given vehicle whereby when the vehicle is run onto the pairs of trackways it is automatically shifted by rotation of the tracks about their axes to a medial position upon the stand.

5. A storage stand for vehicles comprising pairs of parallel sets of rotary members, said pairs spaced approximately from each other a distance equal to the gage of a given vehicle whereby when the vehicle is run onto the pairs of trackways it is automatically shifted by rotation of the tracks about their axes to a medial position upon the stand.

6. An apparatus for automatically centering a wheeled vehicle in a given position, comprising pairs of sets of parallel rotary members, each pair consisting of members spaced apart a distance to accommodate and support a tire of a wheel of a vehicle and to roll about their own axis when the wheels of a vehicle are off center with respect to the medial plane between the tracks of each pair and within vertical planes extending along the axes of each pair.

In testimony whereof I affix my signature.

CHARLES L. SEYLER.